United States Patent
Cho et al.

(10) Patent No.: US 8,347,318 B2
(45) Date of Patent: Jan. 1, 2013

(54) APPLICATION COMPONENT COMMUNICATION APPARATUS OF SCA-BASED SYSTEM AND METHOD THEREOF

(75) Inventors: Eun-Seon Cho, Daejeon (KR); Sang-Chul Oh, Daejeon (KR); Chan-Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1471 days.

(21) Appl. No.: 11/743,148

(22) Filed: May 2, 2007

(65) Prior Publication Data

US 2008/0109828 A1 May 8, 2008

(30) Foreign Application Priority Data

Nov. 2, 2006 (KR) .................. 10-2006-0107638

(51) Int. Cl.
*G06F 3/00* (2006.01)
*G06F 9/44* (2006.01)
*G06F 9/46* (2006.01)
*G06F 13/00* (2006.01)
(52) U.S. Cl. ........................................ 719/320
(58) Field of Classification Search .............. 719/320
See application file for complete search history.

(56) References Cited

U.S. PATENT DOCUMENTS

| | | | | |
|---|---|---|---|---|
| 5,699,521 | A * | 12/1997 | Iizuka et al. | 709/240 |
| 6,516,322 | B1 * | 2/2003 | Meredith | 1/1 |
| 6,966,050 | B2 * | 11/2005 | Watase et al. | 717/109 |
| 7,100,148 | B2 | 8/2006 | Schneider et al. | |
| 7,487,493 | B1 * | 2/2009 | Faulkner | 717/105 |
| 2002/0053070 | A1 * | 5/2002 | Seki | 717/107 |
| 2006/0193282 | A1 * | 8/2006 | Ikawa et al. | 370/328 |

FOREIGN PATENT DOCUMENTS

| | | |
|---|---|---|
| KR | 100248007 B1 | 12/1999 |
| KR | 1020020097338 A | 12/2002 |
| KR | 1020050066282 A | 6/2005 |
| KR | 1020070106691 A | 11/2007 |
| WO | WO2005065098 A2 | 7/2005 |

OTHER PUBLICATIONS

M.J Kim et al., "Real-time Swapping Method of Software Components in SCA for SDR," Korea Computer Congress 2006, pp. 175-177, V. 33, No. 1(D), Korean Institute of Information Scientists and Engineers.

(Continued)

*Primary Examiner* — Andy Ho
*Assistant Examiner* — Timothy A Mudrick (57) ABSTRACT

An application component communication method and an apparatus using the same are provided to an SCA-based system for efficiently performing data communication between SCA-based application components by using a dynamic connection manager. The application component communication apparatus includes an application module provided in the SCA-based system and driven, an application packaged by a plurality of application components, and an application factory for generating the application and driving the application components by parsing XML files. The dynamic connection manager registers port information of each of the application components, and establishes a connection for data communication between the application components according to the port information. According to the present invention, data communication between the respective application components can be efficiently performed by using the dynamic connection manager.

11 Claims, 5 Drawing Sheets

OTHER PUBLICATIONS

Injun Song et al., "Dynamic Reconfigurable Mechanism using Asynchronous Replacement of Component," 2004 Spring International Conference, Apr. 2004, V. 31, No. 1(A), Korean Institute of Information Scientists and Engineers, pp. 1-3.

Sang-Kook Jeong et al., "A Survey for the design and development of Reconfigurable SDR Mobile Station," Journal of Korean Society for Internet Information, Apr. 2006, pp. 121-136, V. 7, No. 2.

Saehwa Kim et al., "Structure of software for SDR system", Journal of Korea Institute of Electronics Engineers, Apr. 2006, pp. 1-11, V. 33, No. 2.

SCA Software Framework for SDR Mobile Platform, 27-38 (2003).

Saehwa Kim, et al., *"Designing SCA-Based Component Framework for Dynamic Deployment of SDR Components"*, Journal of Korea Information Science Society Jun. 2003 vol. 9, No. 3, pp. 1-13.

* cited by examiner

```xml
<connections>
<connectinterface id="Connection1">
    <usesport>
      <usesidentifier>AData1Out</usesidentifier>
      <componentinstantiationref refid="DCE:6ae81aa2-cc32-4c5a-a981-ba1c6e64d0f4"/>
    </usesport>
    <providesport>
      <providesidentifier>BData1In</providesidentifier>
      <componentinstantiationref refid="DCE:6ae81aa2-cc32-4c5a-a981-ba1c6e64d0f3"/>
    </providesport>
  </connectinterface>

<connectinterface id="Connection2">
    <usesport>
      <usesidentifier>BData1Out</usesidentifier>
      <componentinstantiationref refid="DCE:6ae81aa2-cc32-4c5a-a981-ba1c6e64d0f3"/>
    </usesport>
    <providesport>
      <providesidentifier>AData1In</providesidentifier>
      <componentinstantiationref refid="DCE:6ae81aa2-cc32-4c5a-a981-ba1c6e64d0f4"/>
    </providesport>
  </connectinterface>

<connectinterface id="Connection3">
    <usesport>
      <usesidentifier>AData2Out</usesidentifier>
      <componentinstantiationref refid="DCE:6ae81aa2-cc32-4c5a-a981-ba1c6e64d0f4"/>
    </usesport>
    <providesport>
      <providesidentifier>CData1In</providesidentifier>
      <componentinstantiationref refid="DCE:6ae81aa2-cc32-4c5a-a981-ba1c6e64d0f3"/>
    </providesport>
  </connectinterface>

<connectinterface id="Connection4">
    <usesport>
      <usesidentifier>CData1Out</usesidentifier>
      <componentinstantiationref refid="DCE:6ae81aa2-cc32-4c5a-a981-ba1c6e64d0f3"/>
    </usesport>
    <providesport>
      <providesidentifier>AData2In</providesidentifier>
      <componentinstantiationref refid="DCE:6ae81aa2-cc32-4c5a-a981-ba1c6e64d0f4"/>
    </providesport>
  </connectinterface>

...
</connections>
```

APPLICATION COMPONENT COMMUNICATION APPARATUS OF SCA-BASED SYSTEM AND METHOD THEREOF

CROSS-REFERENCE TO RELATED APPLICATIONS

This application claims priority to and the benefit of Korean Patent Application No. 10-2006-0107638 filed in the Korean Intellectual Property Office on Nov. 2, 2006, the entire contents of which are incorporated herein by reference.

BACKGROUND OF THE INVENTION (a) Field of the Invention

The present invention relates a Software Communications Architecture (SCA)-based system, and more particularly, relates to an application component communication apparatus of an SCA-based system for efficient data communication between SCA-based application components, and a method thereof.

(b) Description of the Related Art

Software Communications Architecture (SCA) is a standard communication software architecture proposed by the Joint Tactical Radio System (JTRS) Joint Program Office (JPO) in the U.S. for improving interaction between communication systems and reducing development and arrangement costs. Such an SCA adopts a real-time operating system (RTOS) and a Common Object Request Broker Architecture (CORBA) as middleware, and provides an integration environment for heterogeneous hardware and software. Herein, the CORBA is a standard architecture for distributed object systems. The SCA is not a system-specific standard architecture but is an open system design framework.

An SCA-based system refers to a communication system or a communication apparatus based on such an SCA. For example, a Software Defined Radio (SDR) system adopts the SCA as a software framework standard. In the SCA, when disposing and driving one application, several application components associated with the application are grouped into one package and the package is disposed and driven, or the several application components are separately disposed and driven.

When initially driving an application in a conventional SCA-based system, an application factory parses connection information formed in a transmit port OutPort and a receive port InPort, defined in an extensible Markup Language (XML) file, maps the parsed connection information with an object reference, and establishes a one-directional connection to be used by each of the components during the initial driving stage. Herein, the object reference is a runtime address of a transmit port OutPort and a receive port InPort of each of the components.

Accordingly, each component transmits data by using a transmit port reference (OutPort Object Reference), which is a runtime address of a transmit port (OutPort) connected with another component to be receiving the data such that mutual data communication between the two components can be achieved.

However, when one of the two components is abnormally turned off or replaced with another component, a transmit port object reference and a receive port object reference of the component are changed, and thus all connection information connected to the component are disconnected. When a component attempts to transmit data to a port of a different component or data is written in a wrong memory address, the component can be shut down and this may cause the overall system to be shut down. For example, when an application is embedded in a server system, the server system can be shut down.

An application component communication architecture of the conventional SCA-based system is very complicated to operate due to an increasing number of components, and it has a drawback of affecting severe damage to the overall application by a static port or a static connection of a component of the application when the component is replaced with another component or the component is shut down during operation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an application component communication method of an SCA-based system having advantages of efficiently performing data communication by using a dynamic connection manager, and an apparatus using the same.

In addition, the present invention provides an application component communication method of an SCA-based system that can support seamless operation of the system even though one of application components is shut down or replaced by dynamically establishing a connection between the components, and an apparatus using the same.

An exemplary application component communication apparatus of an SCA-based system according to an embodiment of the present invention includes an application module, an application factory, and a dynamic connection manager. The application module is provided in the SCA-based system and driven, and includes an application packaged by a plurality of application components. The application factory generates the application, and drives the plurality of application components by parsing eXtensible Markup Language (XML) files. The dynamic connection manager registers port information on each of the respective application components, and establishes a data communication connection between the application components.

An exemplary application component communication method according to another embodiment of the present invention is provided to an SCA-based system. The application component communication method includes: a) when an application is provided in the SCA-based system and driven, parsing an XML file; b) driving each of application components associated with the application; c) registering port information on each of the application components with a dynamic connection manager that establishes a data communication connection between the application components; and d) transmitting/receiving data according to port information registered with the dynamic connection manager.

BRIEF DESCRIPTION OF THE DRAWINGS

FIG. 3 shows a definition of a connection of a typical application package XML file.

DETAILED DESCRIPTION OF THE EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Hereinafter, an application component communication apparatus of a Software Communications Architecture (SCA)-based system and a method thereof according to an exemplary embodiment of the present invention will be described in more detail with reference to the accompanying drawings.

Figure 1:
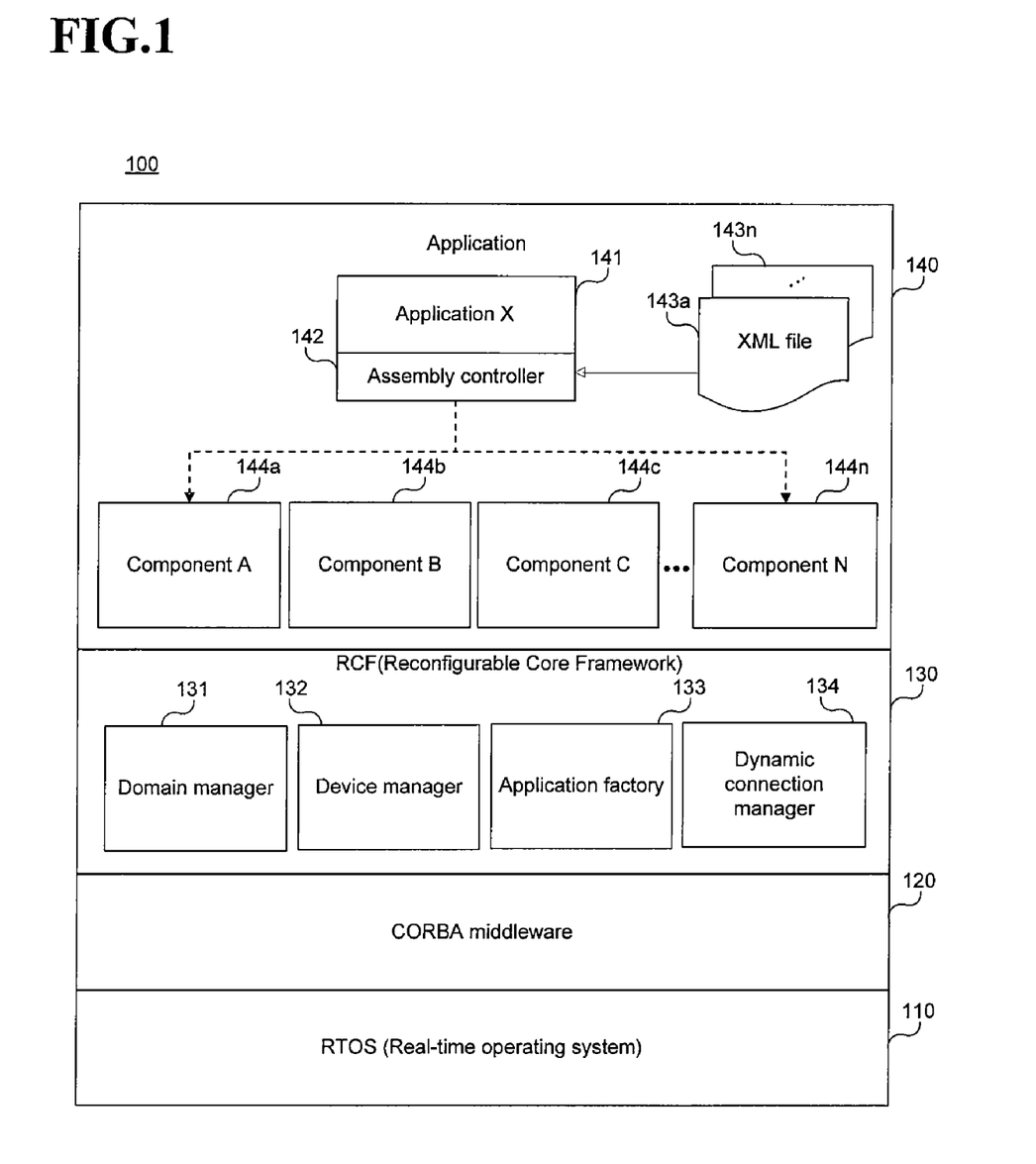
FIG. 1 is a schematic diagram of an SCA-based system according to an exemplary embodiment of the present invention.

FIG. 1 is a schematic diagram of the SCA-based system according to the exemplary embodiment of the present invention, and it illustrates components for software functions of the SCA-based system.

As shown in FIG. 1, an SCA-based system 100 according to the exemplary embodiment of the present invention includes a real-time operating system 110, and CORBA middleware 120 defined by the SCA standard.

In addition, the SCA-based system 100 includes an SCA-based reconfigurable core framework (RCF) 130 disposed on top of the operating system 110 and the CORBA middleware 120. The RCF 130 is configured with a domain manager 313, a device manager 132, an application factory 131, and a dynamic connection manager 134, and supports system reconfiguration. Accordingly, a plurality of applications for software control and configuration are respectively configured into application components 144a to 144n and packaged.

Herein, the domain manager 131 of the RCF 130 performs registration and release of a device and an application. In addition, the device manager 132 manages a plurality of logical devices that are functionally abstracted from hardware devices.

The application factory 133 of the RCF 130 generates the application 140. In the exemplary embodiment of the present invention, the application factory 133 establishes connections between the components 144a to 144n by using only port information described in extensible Markup Language (XML) files 143a to 143n for enabling data communication between the components 144a to 144n. The port information includes transmit ports (OutPorts) and receive ports (InPorts) between the respective components 144a to 144n. An XML file generally describes hardware and software information, but the plurality of XML files 143a to 143n according to the exemplary embodiment of the present invention describe only the port information for connection between the components 144a to 144n.

According to the exemplary embodiment of the present invention, an operator interface packages software components into one application package and arranges the application package to a driving device for driving the application package. The operator interface performs download, arrangement, and driving of the application package of the SCA-based system 100 by interacting with the domain manager 131 of the RCF 130. In this case, application package information, component package information, and component information are described in the respective XML files 143a to 143n.

When port information on a transmit port and a receive port of each of the components 144a to 144n is registered with the dynamic connection manager 134, the dynamic connection manager 134 dynamically establishes a connection for data communication by using the port information. Herein, the XML files 143a to 143n do not describe one-directional connection information but describe only port information on two types of ports for one component, and the two types of ports include a transmit port and a receive port.

For example, the component A 144a has one receive port for receiving data and one transmit port for transmitting data in the SCA-based system according to the exemplary embodiment of the present invention. The component A 144a monitors the receive port to check whether data is received and transmits data to the next component through the transmit port. In addition, the component B 144b has one receive port for receiving data and one transmit port for transmitting data. The component B 144b monitors the receive port to check whether data is received and transmits data to the next component through the transmit port.

Figure 2:
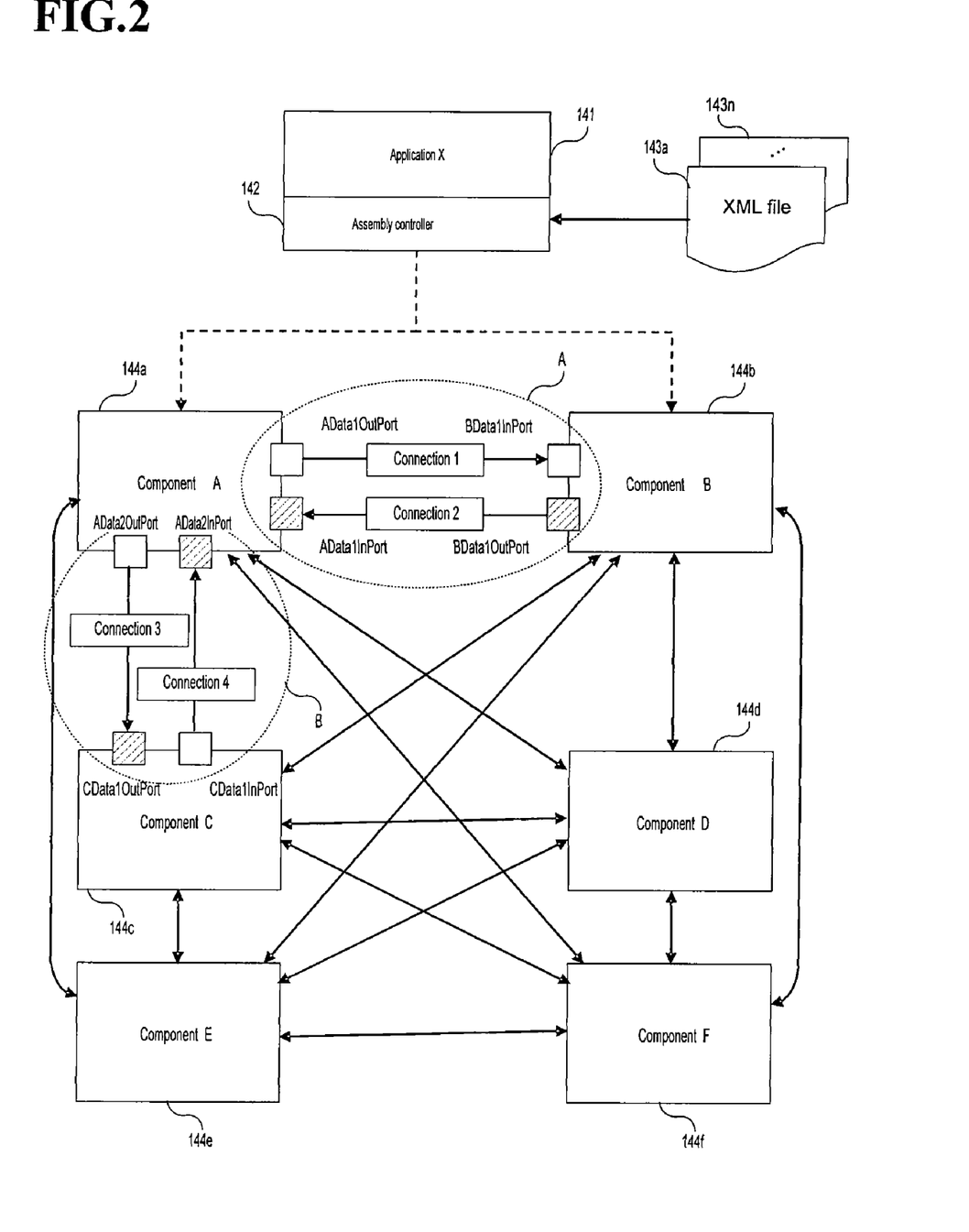
FIG. 2 shows a communication process between application components in a typical SCA-based system.

FIG. 2 and FIG. 3 show a communication process between application components of a typical SCA-based system.

FIG. 2 shows the communication process between the application components of the typical SCA-based system, and like reference numerals of FIG. 2 designate like elements of the SCA-based system of FIG. 1, for convenience of description.

In general, when one application is driven in the typical SCA-based system, components included in the application communicate data with each other by using connection information between the components, and an application factory that generates the application establishes a connection between the respective components. Herein, the connection information is formed of a transmit port (OutPort) and a receive port (InPort) between components, and is described in an XML file.

The connection information that defines the connection between the transmit port (OutPort) and the receive port (InPort) must be defined and set between all components that need data communication, included in one application. Particularly, the SCA defines a connection between components as a one-directional connection. For example, a connection between components is defined as Connection 1 of AData1OutPort and BData1InPort or Connection 2 of BData1OutPort and AData1InPort (see FIG. 2). Such connection information and port information are described in the XML file for management.

In further detail, as shown in FIG. 2, one SCA-based application 140 is formed of a plurality of application components 144a to 144n, and the application components 144a to 144n are respectively controlled by an assembly controller 142. In this case, the respective components 144a to 144n include a transmit port and a receive port for mutual communication.

Information on the respective application components 144a to 144n and connection information between ports are separately managed by the XML files 143a to 143n, and the XML files 143a to 143n are also packaged to an application package. For example, when an application X 141 is installed on the SCA-based system 100 and driven by the SCA-based system 100, the application factory 133 drives corresponding components 144a to 144n of the application X 141 by parsing corresponding XML files 143a to 143n, and each of the components 144a to 144n driven by the application factory 133 registers its name and object reference with a naming server (not shown).

In addition, the application factory 133 receives a port object reference, which is run-time information, from the respective components 144a to 144n, maps the port object reference to connection information described in each of the XML files 143a to 143n, and establishes a connection between ports. The components 144a to 144n mutually communicate with each other by using the connection information.

For example, a reference numeral "A" in FIG. 2 denotes one-directional connections established between component A 144a and component B 144b. The component A 144a transmits data to the component B 144b by referring to an object reference of a transmit port AData1OutPort that corresponds to Connection 1. Accordingly, the data is transmitted to a receive port BData1InPort of the component B 144b through the Connection 1, and the component B 144b receives the data through the receive port BData1InPort.

When the component B 144b transmits data to the component A 144a, the component B 144b transmits the data by referring to an object reference of a transmit port BData2OutPort that corresponds to Connection 2. Accordingly, the data is transmitted to a receive port AData2InPort through the Connection 2, and the component A 144a receives the data through the receive port AData2InPort.

In addition, the component A 144a and component C 144c communicate data with each other through Connection 3 and Connection 4 as denoted by a reference numeral "B" of FIG. 2.

In this case, each connection is a one-directional connection, and therefore two components require two connections. That is, the number of ports and the number of connections significantly increase as the number of the components 144a to 144n increases.

FIG. 3 shows a definition of connection information described in an XML file included in a typical application package, and it defines connection information between the respective ports for the Connection 1 to the Connection 4 of FIG. 2.

As shown in FIG. 3, in connection information of a connection defined in the typical application package XML file, "Connection N" element denotes a connection identifier and it must define a one-directional connection for all components that need to be connected. In addition, the "usesport" element identifies a transmit port OutPort of a component that transmits data, and the "providesport" element identifies a receive port InPort of a component that receives the data. The application factory 133 establishes a connection between the transmit port and the receive port by using the connection information.

Figure 4:
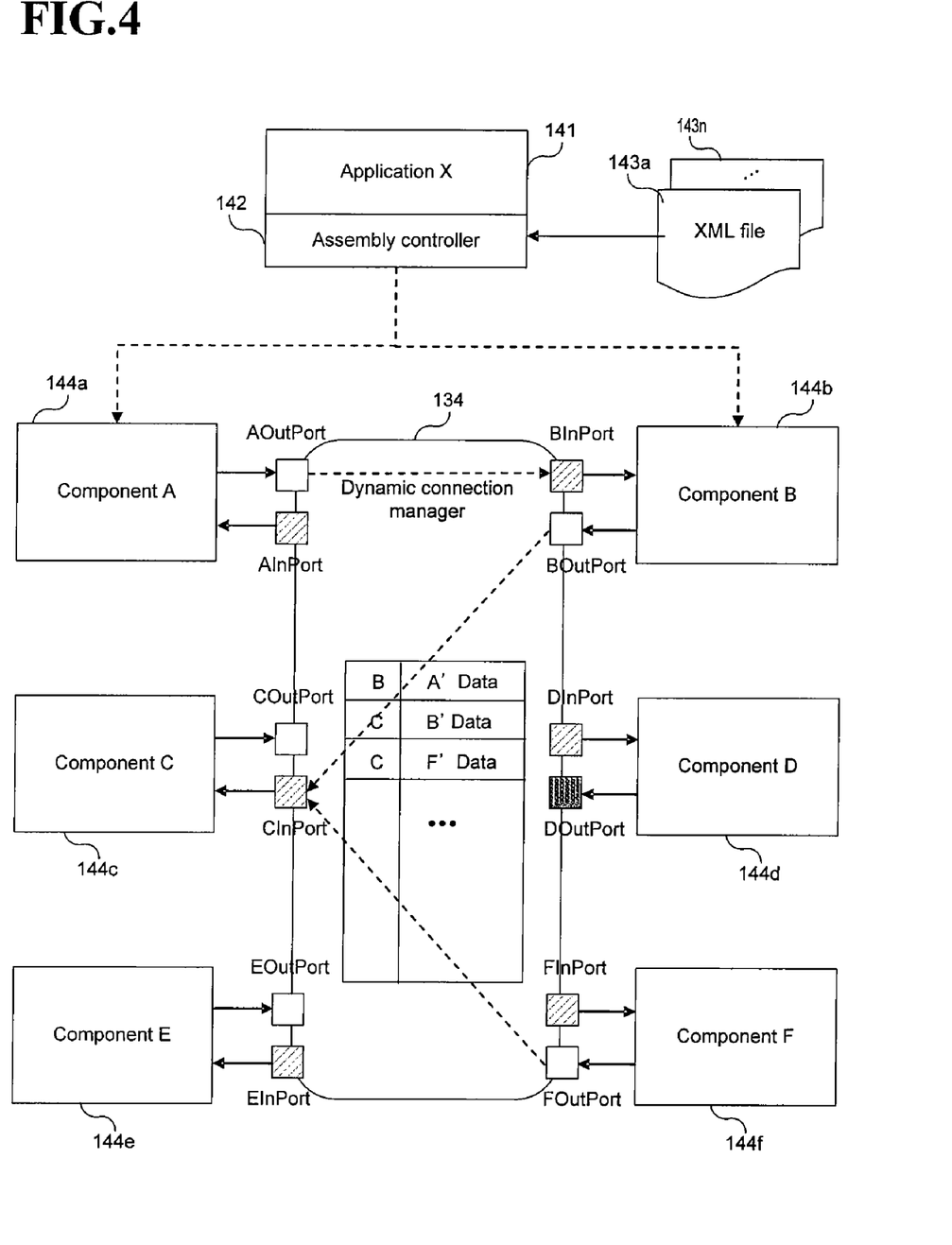
FIG. 4 shows a communication process between application components in the SCA-based system according to the exemplary embodiment of the present invention.

FIG. 4 shows a communication process between application components in the SCA-based system according to the exemplary embodiment of the present invention.

As shown in FIG. 1 and FIG. 4, the application component communication apparatus of the SCA-based system according to the exemplary embodiment of the present invention is provided in the SCA-based system 100 and driven, and includes the application 140 packaged by the plurality of application components 144a to 144n, the application factory 133 that generates the application 140 that drives the application components 144a to 144n by parsing the XML files 143a to 143n, and the dynamic connection manager 134 that registers port information of each of the application components 144a to 144n and establishes a connection for data communication between the application components 144a to 144n.

When the application X 141 is provided in the SCA-based system 100 and driven, the application factory 133 drives each of the components 144a to 144n by parsing the XML files 143a to 143n. During this initial driving stage, the application factory 133 does not establish connections between ports of the components 144a to 144n.

When each of the components 144a to 144n registers port information on a transmit port OutPort and a receive port InPort of the component with the dynamic connection manager 134, the dynamic connection manager 134 dynamically establishes a connection by using the port information for data communication between the ports.

In this case, each of the XML files 143a to 143n do not describe one-directional connection information, but rather define port information on two types of ports, which are a transmit port OutPort and a receive port InPort, for one component. In the structure of the SCA-based system according to the exemplary embodiment of the present invention, the component A 144a has one receive port AInPort for monitoring whether data is received through the receive port and one transmit port AOutPort for transmitting data to the next component through the transmit port.

The component B 144b also has one receive port BInPort for monitoring whether data is received through the receive port and one transmit port BOutPort for transmitting data through the transmit port. When the component A 144a transmits data to the component B 144b, the component A 144a transmits data to be transmitted through the AOutPort and a name of a receiving component (i.e., component B) to the AOutPort. Then, the dynamic connection manager 134 transmits the data to the BInPort of the component B 144b. Since multiple components 144a to 144n can simultaneously transmit data, a corresponding dynamic connection manager 134 processes data transmission/receiving according to First In First Out (FIFO) order by managing a data queue.

As described, each of the components 144a to 144n defines two ports (i.e., transmit port and receive port) and monitors data flow through the two ports rather than defining complex connections so that the components 144a to 144n can simply communicate data with each other.

Figure 5:
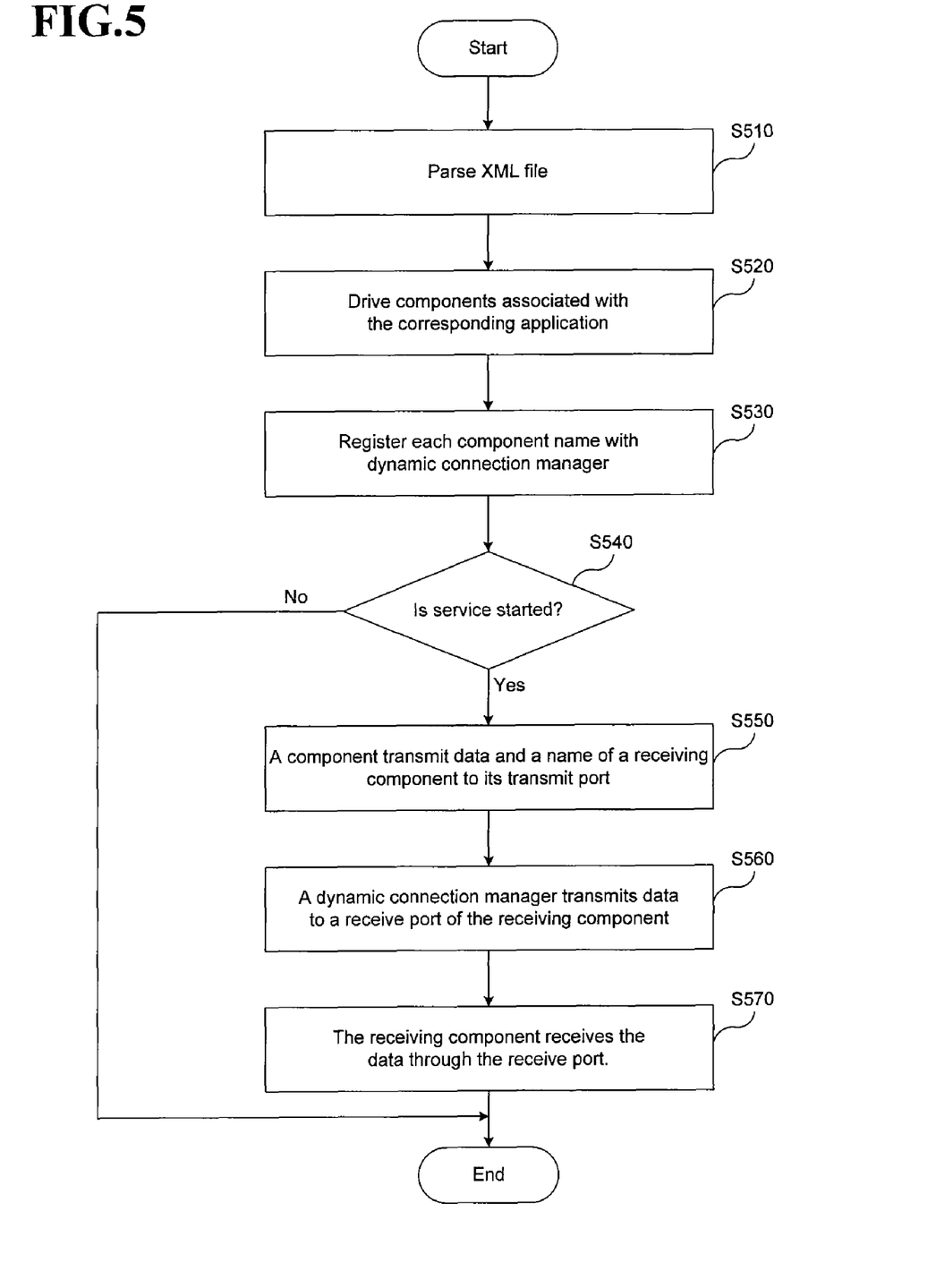
FIG. 5 is an operational flowchart of a data transmission process of an application component in the SCA-based system according to the exemplary embodiment of the present invention.

FIG. 5 shows an operational flowchart of a data transmission process of an application component in the SCA-based system according to the exemplary embodiment of the present invention.

As shown in FIG. 4 and FIG. 5, when the application X 141 is provided in the SCA-based system 100 and driven, the application factory 133 parses the XML files 143a to 143n in step S510, and drives corresponding components of the application X 141, in step S520.

Subsequently, each of the components 144a to 144n registers a transmit port OutPort and a receive port InPort of the component with the dynamic connection manager 134, in step S530.

When a service is started in step S540 and thus data communication between the respective components 144a to 144n is required, a component transmits data and a name of a component to be receiving the data to a transmit port OutPort in step S550, and the data is automatically stored in the data queue managed by the dynamic connection manager 134 and the dynamic connection manager 134 sequentially transmits data stored in the FIFO data queue to a receive port InPort of the corresponding component in step S560. Accordingly, the corresponding component receives the data through its receive port InPort, in step S570.

The XML file according to the exemplary embodiment of the present invention is modified to define a transmit port and a receive port of each component rather than to define information on a connection between ports such that the number of connections and the number of ports can be reduced. In addition, the dynamic connection manager dynamically establishes a connection between components for data communication and process data transmission/receiving by using the data queue.

Accordingly, the exemplary embodiment of the present invention can be applied to all SCA-based systems, and such an SCA can be applied to an SDR system for supporting multimode operation and reconfiguration.

According to the exemplary embodiment of the present invention, data communication between SCA-based application components can be efficiently performed by using the dynamic connection manager. In addition, a connection between the application components can be dynamically established while the SCA-based system is being driven, and thereby the SCA-based can be seamlessly operated even though one of the components is shut down or replaced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An application component communication unit of a Software Communications Architecture (SCA)-based system implemented on a non-transitory computer readable medium, the application component communication unit comprising:
    code for an application module, the application module operable to be executed by a command provided through the user interface, wherein the application module including an application is packaged by a plurality of application components;
    code for an application factory, the application factory operable to generate the application, and -execute the plurality of application components by parsing eXtensible Markup Language (XML) files; and
    code for a dynamic connection manager, the dynamic connection manager configured to receive data and register port information from transmitting application components, store the data in a data queue, establish a data communication connection between the transmitting application components and receiving application components based on the registered port information, and transmit the data stored in the data queue to the receiving application components via the established data communication connection,
    wherein the transmission of the data stored in the data queue to the receiving application components is controlled by the dynamic connection manager.

2. The application component communication unit of claim 1, wherein the dynamic connection manager is configured to process data transmission by managing the data queue when the plurality of application components simultaneously transmits data.

3. The application component communication unit of claim 2, wherein the data queue is a First In First Out (FIFO) type of queue.

4. The application component communication unit of claim 1, wherein each of the application components registers its port information with the dynamic connection manager.

5. The application component communication unit of claim 1, wherein the application factory does not perform connection establishment between ports of the respective application components during an initial execution stage of the application components.

6. The application component communication unit of claim 1, wherein the port information includes transmit port information and receive port information.

7. The application component communication unit of claim 1, wherein the port information is described in the XML file.

8. A computer implemented method running on a Software Communications Architecture (SCA)-based system, the method comprising:
    a) parsing an eXtensible Markup Language (XML) file contained in an application when the application is provided in the SCA-based system;
    b) executing each of application components associated with the application;
    c) registering port information on each of the application components with a dynamic connection manager and establishing a data communication connection between application components using the registered port information;
    d) receiving data from transmitting application components and storing the data in a data queue of the dynamic connection manager; and
    e) transmitting the data stored in the data queue to receiving application components via the established communication connection,
    wherein the transmission of the data stored in the data queue to the receiving application components is controlled by the dynamic connection manager according to a given rule.

9. The application component communication method of claim 8, wherein e) comprises:
    e-1) when data communication is required between the transmitting application components and the receiving application components, transmitting the data stored in the data queue to transmit ports of the transmitting application components;
    e-2) transmitting data stored in the data queue sequentially according to a data queue order to receive ports of the receiving application components, by the dynamic connection manager; and
    e-3) receiving the data through the receive ports of the receiving application components.

10. The application component communication method of claim 9, wherein, in e-1), the data is automatically stored in the data queue managed by the dynamic connection manager.

11. The application component communication method of claim 8, wherein the port information includes transmit port information and receive port information, and is described in the XML file.

* * * * *